US011194979B1

(12) United States Patent
Brakob et al.

(10) Patent No.: US 11,194,979 B1
(45) Date of Patent: Dec. 7, 2021

(54) ITEM TRACKING SYSTEM

(71) Applicant: Target Brands, Inc., Minneapolis, MN (US)

(72) Inventors: Christopher M. Brakob, Maple Grove, MN (US); Ethan Joshua Sommer, Eden Prairie, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/021,257

(22) Filed: Sep. 15, 2020

(51) Int. Cl.
G06K 7/08 (2006.01)
G06K 7/10 (2006.01)
G06Q 20/32 (2012.01)

(52) U.S. Cl.
CPC ..... *G06K 7/10366* (2013.01); *G06Q 20/3278* (2013.01)

(58) Field of Classification Search
CPC .... G06K 9/00771; H04N 7/181; H08B 13/19; H04L 67/10
USPC .............. 235/451, 462.46, 472.02, 383, 385
See application file for complete search history.

(56) References Cited

U.S. PATENT DOCUMENTS

| 8,907,795 | B2 | 12/2014 | Soto et al. |
| 9,036,028 | B2 | 5/2015 | Buehler |
| 9,311,799 | B2 | 4/2016 | Jain et al. |
| 9,378,632 | B2 | 6/2016 | Venetianer et al. |
| 9,473,747 | B2 * | 10/2016 | Kobres ................. G06Q 30/00 |
| 10,142,777 | B1 | 11/2018 | Wulff |
| 10,275,617 | B2 | 4/2019 | Hanis et al. |
| 10,319,204 | B1 | 6/2019 | Wulff |
| 10,460,585 | B2 | 10/2019 | Chabra et al. |
| 2010/0138037 | A1* | 6/2010 | Adelberg ............. G06Q 10/087 700/241 |
| 2010/0325020 | A1* | 12/2010 | Junger ................. G06Q 10/087 705/28 |
| 2012/0271712 | A1* | 10/2012 | Katzin ................... G07G 3/003 705/14.51 |
| 2013/0027561 | A1* | 1/2013 | Lee ..................... G06K 9/00302 348/150 |
| 2013/0201337 | A1 | 8/2013 | Tapp et al. |
| 2013/0238471 | A1* | 9/2013 | Maraz ................. G06Q 10/087 705/28 |
| 2014/0180790 | A1* | 6/2014 | Boal .................. G06Q 30/0211 705/14.42 |

(Continued)

FOREIGN PATENT DOCUMENTS

JP 2008203974 A2 9/2008

OTHER PUBLICATIONS

Singh et al., RFID: Dynamic Surveillance Approach, International Journal of Computer Science Issues, vol. 7, Issue 3, No. 7, pp. 24-28, 2010.

(Continued)

*Primary Examiner* — Daniel St Cyr
(74) *Attorney, Agent, or Firm* — Theodore M. Magee; Westman, Champlin & Koehler, P.A.

(57) ABSTRACT

A computer-implemented method includes determining that a group of items left a space together based on RFID exit times and determining that at least one item of the group of items left the space without authorization by evaluating transactions that took place within a first time period before the at least one item left the space. A single investigation file is automatically created that includes the group of items that left the space together.

5 Claims, 8 Drawing Sheets

(56) References Cited

U.S. PATENT DOCUMENTS

| | | |
|---|---|---|
| 2016/0321661 A1* | 11/2016 | Hammond ............ G06Q 20/407 |
| 2018/0184144 A1 | 6/2018 | Corrall et al. |
| 2019/0311592 A1 | 10/2019 | Wulff |
| 2020/0043320 A1 | 2/2020 | Carey |
| 2020/0077054 A1 | 3/2020 | Mariadoss |
| 2020/0082692 A1 | 3/2020 | Jeon et al. |

OTHER PUBLICATIONS

MARCH Networks, Unlock New Business Insights with Video and RFID Data, http://www.marchnetworks.com/rfid/, 5 pages, 2020.
RFID Journal, Can RFID be Integrated with IP Cameras?, https://www.rfidjournal.com/blogs/experts/entry?10868, 1 page, 2014.

\* cited by examiner

ITEM TRACKING SYSTEM

BACKGROUND

Radio frequency identifier (RFID) tags generate a radio frequency signal that includes a unique identifier for the tag. A radio frequency sensor receives this signal and decodes the identifier from the signal to identify the tag. By using multiple sensors dispersed across a space, it is possible to estimate the location of the RFID tag within the space.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes determining that a group of items left a space together based on RFID exit times and determining that at least one item of the group of items left the space without authorization by evaluating transactions that took place within a first time period before the at least one item left the space. A single investigation file is automatically created that includes the group of items that left the space together.

In accordance with a further embodiment, a computer includes a memory containing instructions and a processor executing the instructions in the memory to perform steps. The steps include identifying a group of items that left a space together and determining that one of the items in the group was not authorized to leave the space and another of the items was authorized to leave the space through a transaction. An identifier for at least one of a person and a payment method involved in the transaction is obtained and previous investigation files are searched for the identifier.

In accordance with a still further embodiment, a method includes receiving time values indicating when items left a space and using the time values to identify a group of items that left the space together. One of the items in the group of items is determined to have left the space without authorization and a transaction is identified that authorized another of the items in the group of items to leave the space. An identifier for at least one of a person and a payment method involved in the transaction is obtained and previous investigation files are searched for the identifier.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The embodiments described below provide an improved RFID tracking system that is able to detect which RFID tags left a space together and to determine which of those RFID tags left the space without authorization. Items that left the space together are stored in a single investigation file thereby making it easier for investigators to review suspect events that are related to each other. In additional embodiments, if any of the RFID tags that left the space together were part of a transaction that authorized the RFID tag to leave the space, an identifier for a person or a payment method is retrieved for the transaction and a search is performed to identify other investigation files involving that identifier. If any of those other transactions are associated with a different investigation file, links are provided to connect the different investigation files together. In still further embodiments, the paths of the RFID tags in the space are displayed on a user interface such that if a user hovers a pointer over a portion of the path, a time and date at which the RFID tag was at that location in the space is displayed over the path.

Figure 1:
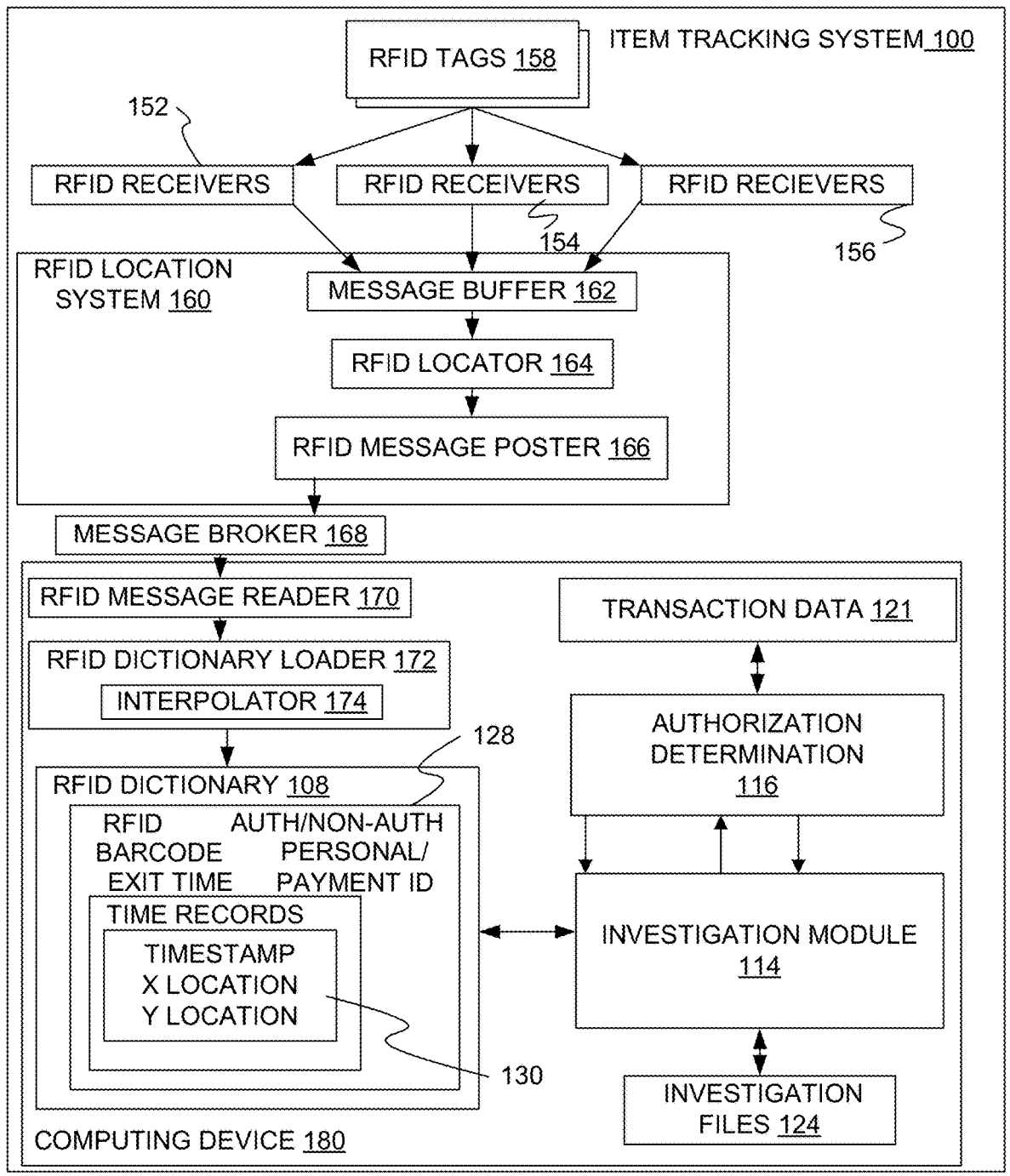
FIG. 1 is a block diagram of an item tracking system.

FIG. 1 provides a block diagram of an item tracking system 100 used to construct investigation files. Item tracking system 100 includes an RFID dictionary 108 that is continuously updated with information about the movement of RFID tags within and out of a space. RFID dictionary 108 includes a separate record 128 for each RFID that has moved within or exited the space.

Specifically, RFID dictionary 108 is updated based on the movements of RFID tags 158 within and out of a space. Each of RFID tags 158 is connected to a respective item and generates a radio signal that carries the value of the RFID and the value of a barcode associated with the RFID tag. Each radio signal is detected by one or more RFID receivers such as RFID receivers 152, 154 and 156 located in the space. In response to the detected signals, the RFID receivers 152, 154 and 156 generate messages that include the RFIDs, the barcode values, and in some cases one or more descriptors of the signal. One or more of the RFID receivers may be positioned at an exit and may convey that the RFID tag passed through the exit. The messages generated by the RFID receivers 152, 154 and 156 are provided to an RFID location system 160. In accordance with one embodiment, the messages are provided to a message buffer 162 in location system 160 and then are accessed by a RFID locator 164, which determines a location of the RFID tags based on the information provided by the RFID receivers. RFID locator 164 then instructs a message poster 166 to post a message for each detected RFID indicating the location of the RFID tag and sometimes additional data such as whether the RFID tag has exited the space and the time at which the RFID tag exited the space. RFID message poster 166 then posts the message to a message broker 168, which may be located on the same computing device as the RFID location system 160 or may be located on a different computing device.

A RFID message reader 170 requests and receives one of the posted messages from message broker 168. RFID message reader 170 parses the received message and provides the parsed information to an RFID dictionary loader 172.

RFID dictionary loader 172 determines if the received message is an exit event. If the received message is an exit event, RFID dictionary loader 172 stores the RFID, its associated barcode, and the time that the RFID exited the space in RFID dictionary 108, which is stored in random access memory of a computing device 180. If the received message is not an exit event, RFID dictionary loader 172 determines if the RFID is in RFID dictionary 108. If the RFID is not in RFID dictionary 108 yet, a record 128 is created for the RFID in RFID dictionary 108. The RFID record 128 includes the RFID and the barcode for the RFID.

If the RFID is in RFID dictionary 108 or after a new record has been created for the RFID in dictionary 108, a time record 130 is added to the RFID record 128. Each time record in RFID dictionary 108 includes a time stamp, an x-coordinate of the location of the RFID and a y-coordinate of the location of the RFID at the measurement period represented by the time stamp. RFID dictionary loader 172 then examines the time records 130 in RFID dictionary 108 for the current RFID to determine if there are any gaps between the latest entered time record and the previously entered time record for this RFID. For example, if RFID messages are collected once per second, time records 130 should contain a separate record for each second indicating the x and y location of the RFID for that second. If time records 130 indicate that no location information was stored for each second between the latest time record and the previous time record, RFID dictionary loader 172 determines that there is a gap in the time records.

If the gap is smaller than a threshold, it is possible for an interpolator 174 in RFID dictionary loader 172 to interpolate the x,y locations of the RFID for each measurement period in the gap of the time records. In accordance with one embodiment, the interpolation is performed by linearly interpolating between the latest recorded x,y locations and the previously recorded x,y locations. The interpolated x,y locations are then stored with their corresponding time stamp in time records 130.

In accordance with one embodiment, RFID message reader 170, RFID dictionary loader 172, and RFID dictionary 108 are all hosted on computing device 180.

In addition to RFID dictionary 108, transaction data 121 is continuously updated as new transactions occur. In accordance with one embodiment, transaction data 121 includes a separate record for each transaction that authorizes removal of an item from the space. Each transaction record includes a transaction identifier, a space identifier, a transaction receipt time, a load time for loading the transaction data into transaction data 121 and barcodes of items associated with the transaction. In accordance with some embodiments, additional information may be stored for each transaction including an originating channel of the purchase (in-space POS or online), the identity of the register where the receipt was generated and for each item involved in the transaction, the price of the item and an instore identifier for the item.

Figure 2:
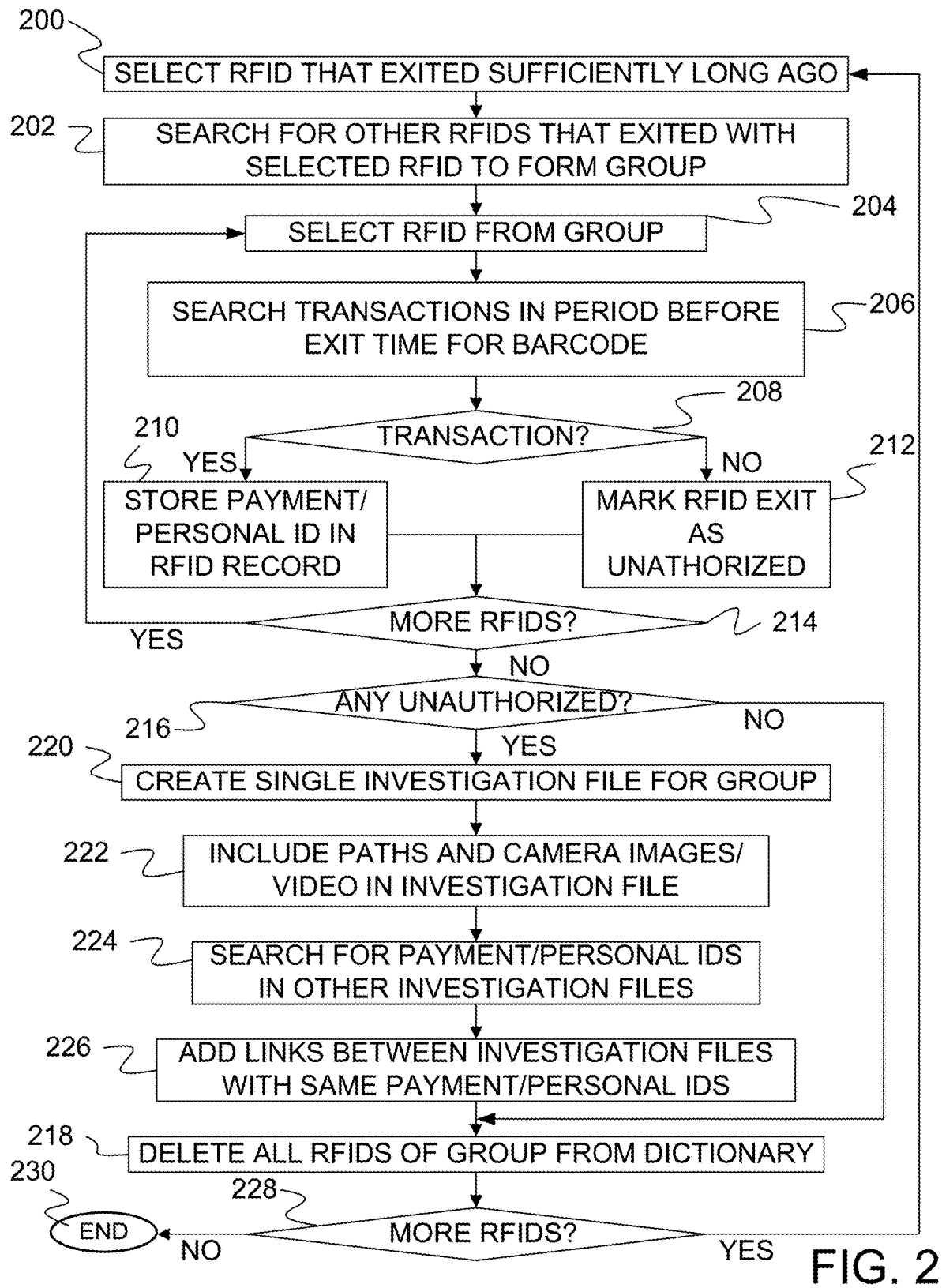
FIG. 2 provides a flow diagram of a method of automatically creating an investigation file.

FIG. 2 provides a flow diagram of a method of generating investigation files based on RFID tags exiting a space.

In step 200 of FIG. 2, an investigation module 114 selects an RFID record from RFID dictionary 108 that has an exit time that precedes the current time by a temporal delay amount. The temporal delay amount can be a fixed amount of time, such as for example 1 hour and 45 minutes, or can be determined by running a query against transactions data 121 to identify the greatest delay between the transaction receipt time and when the transaction record was stored in transaction data 121.

At step 202, investigation module 114 forms a group of RFIDs that are considered to have left the space with the selected RFID. To form this group, investigation module 114 searches RFID dictionary 108 for RFID records with an exit time that is within a selected window of time around the exit time of the selected RFID record. Each found record is added to the group together with the RFID record selected at step 200.

At step 204, investigation module 114 selects one of the RFID records in the group of RFID records and at step 206, investigation module 114 calls an authorization determination module 116 to search for a transaction that may have authorized the removal of the item associated with the RFID record. Authorization determination module 116 uses the barcode and the exit time of the selected RFID record to search for a transaction in transaction data 121 that involved the same barcode as the RFID record and had a transaction receipt time that was before the exit time of the RFID record and that was within a period of time of the exit time. In accordance with one embodiment, the period of time is 20 minutes.

If there are no matching transactions for the RFID record at step 208, authorization determination module 116 returns an indication that the removal of the item from the space was unauthorized and investigation module 114 updates the RFID record to indicate the same at step 212.

If a match for the RFID record is found in transaction data 121 at step 208, authorization determination module 116 retrieves a personal identifier and/or a payment identifier associated with the transaction. In accordance with one embodiment, the personal identifier is an identifier that uniquely identifies a particular person within system 100 but has no meaning outside of system 100. In accordance with one embodiment, the payment identifier uniquely identifies a method of payment, such as a particular credit card, within system 100 but is not the actual identifier, such as a credit card number used outside of system 100. Authorization determination module 116 returns the personal identifier and/or payment identifier to investigation module 114, which updates the RFID record with the personal identifier and/or payment identifier at step 210.

In the embodiment described above, the determination of whether the item associated with the RFID record was authorized to leave the space does not require determining when the RFID tag was at a checkout location. Instead, all transactions that took place within a time period before the RFID tag left the space are examined. This requires less processing time and power than determining when the RFID was at the checkout locations and is advantageous since a large number of RFIDs leave the space and must each be processed.

At step 214, investigation module 114 determines if there are more RFID records in the group to be processed. If there are more RFID records in the group, investigation module 114 selects a different RFID record from the group by returning to step 204. Steps 208-214 are then repeated for the new RFID record.

When all of the RFID records in the group have been processed at step 214, the RFID records of the group are examined at step 216 to determine if any of the records indicate that an item left without authorization. If none of the records indicate that an item left without authorization, there is no need for any further processing of the RFID records. As a result, all of the RFID records in the group are deleted from RFID dictionary 108 at step 218.

If at least one RFID record indicates that an item left the space without authorization at step 216, a single investigation file is created in investigation files 124 for the group at step 220. The contents of all of the RFID records of the group are placed in the investigation file at step 222 including the time records 130, which indicate the paths of the RFID tags before they exited the store. In further embodiments, camera information is stored in the investigation file for one or more locations along the path of each RFID. This camera information can include the identity of a camera that captured images of a location at the time the RFID was at the location and/or a link to a camera image or a sequence of camera images that were captured while the RFID was at the location. In still further embodiments, the camera information can include images or video captured by the cameras at the times that one or more of the items in the group of items were in the view of the camera.

At step 224, investigation module 114 searches investigation files 124 for other investigations that list the personal identifier and/or payment identifier of any of the RFID records stored in the investigation file created at step 220. Note that the group of RFID records in the investigation file can include RFIDs that were authorized to leave the space in separate transactions. As a result, multiple personal identifiers or payment identifiers can be associated with the group of RFIDs. In accordance with one embodiment, a separate search of previous investigation files is performed for each personal/payment identifier that is associated with the group of RFID records. This removes errors that would otherwise occur if it is assumed that all items that exited the space together were authorized for removal from the space in a single transaction. It is possible, as discovered by the present inventors, that items can exit a space together but be authorized for removal in separate transactions. By allowing RFIDs that were authorized in different transactions to be grouped in a same investigation file, embodiments avoid missing a transaction that can be used as a link to other investigation files.

If an earlier investigation file is found that includes one of the personal identifiers or payment identifiers in the investigation file created at step 220, the earlier investigation file and the investigation file created at step 220 are linked together at step 226. In accordance with one embodiment, this linking involves including an identifier for the earlier investigation file in the investigation file created at step 220 and placing an identifier for the investigation file created at step 220 in the earlier investigation file. In some embodiments, when a user interface is generated to view an investigation file that is linked to another investigation file, a selectable link to the other investigation file is displayed. When this link is selected by the user, contents of the other investigation file are displayed to the user. This allows the investigator to quickly establish patterns of behaviour of a suspect and to tie together different crimes so that they can be charged together.

Because multiple personal identifiers or payment identifiers may be associated with a group, the investigation file may be linked to one previous investigation file based on a first personal/payment identifier and may be linked to a second previous investigation file based on a second personal/payment identifier.

After the investigation files have been linked together at step 226, investigation module 114 deletes all of the RFID records of the group from RFID dictionary 108 at step 218.

After step 218, investigation module 114 determines if there are more RFID records in RFID dictionary 108 that exited sufficiently long ago to be processed at step 228. If there are more RFID records to be processed, investigation module 114 returns to step 200 and selects another RFID record. When all of the RFID records of RFID dictionary 108 have been processed, the method of FIG. 2 ends at step 230 and a timer is set to restart the process of FIG. 2.

Figure 3:
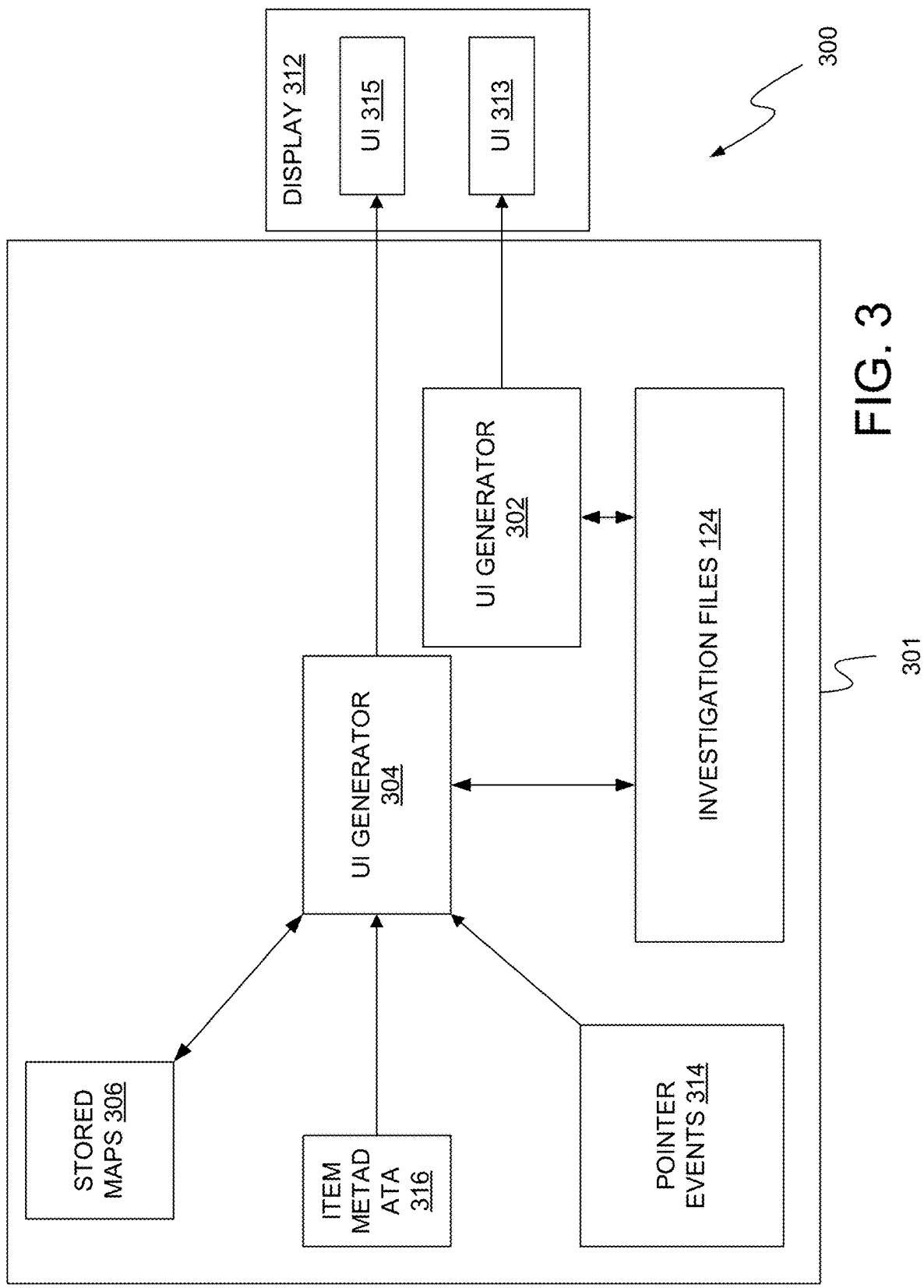
FIG. 3 is a block diagram of a system used to display an indication of when an item was at a location when a user hovers a pointer over a displayed path.

In accordance with further embodiments, a user interface is generated that displays paths of RFID tags through a space and will display a time when the RFID tag was at a particular location when a user hovers a pointer over that portion of the path. FIG. 3 provides a block diagram of a system 300 consisting of a computing device 301 and a display 312 for generating such graphics and FIG. 4 provides a flow diagram of a method of generating such graphics.

Figure 4:
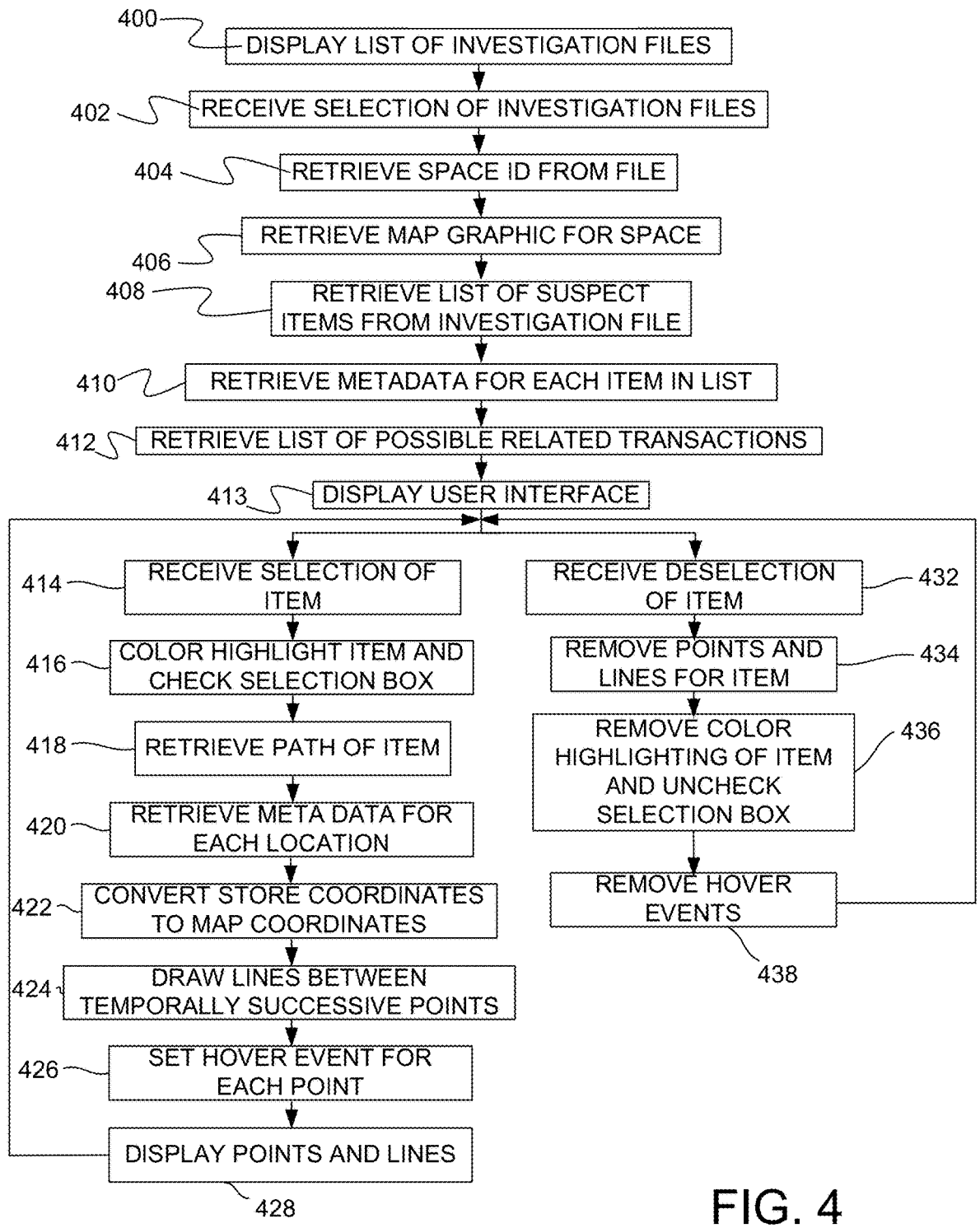
FIG. 4 is a flow diagram of a method of displaying an indication of when an item was at a location when a user hovers a pointer over a displayed path.

In step 400 of FIG. 4, a user interface generator 302 generates a user interface 313 containing a list of the investigation files 124 and displays the user interface on display 312. At step 402, a selection of one of the investigation files displayed in user interface 313 is received, causing a user interface generator 304 to retrieve a space identifier from the selected investigation file 124 at step 404. The space identifier identifies a space from which at least one item was taken without authorization. At step 406, user interface generator 304 retrieves a map graphic associated with the space identifier from stored maps 306. This map is a graphical image of the layout of the space and has X and Y dimensions that define (x,y) coordinates for each position on the graphic. At step 408, user interface generator 304 retrieves a list of items from the selected investigation file 124 that are suspected of leaving the space without authorization. At step 410, user interface generator 304 retrieves metadata for each item retrieved at step 408. Examples of such metadata include an image of the item, a name of the item, the item's department, the item's cost (if any), and one or more identifiers for the item. At step 412, user interface generator 304 retrieves a list of possible related transactions from the selected investigation file 124.

Figure 5:
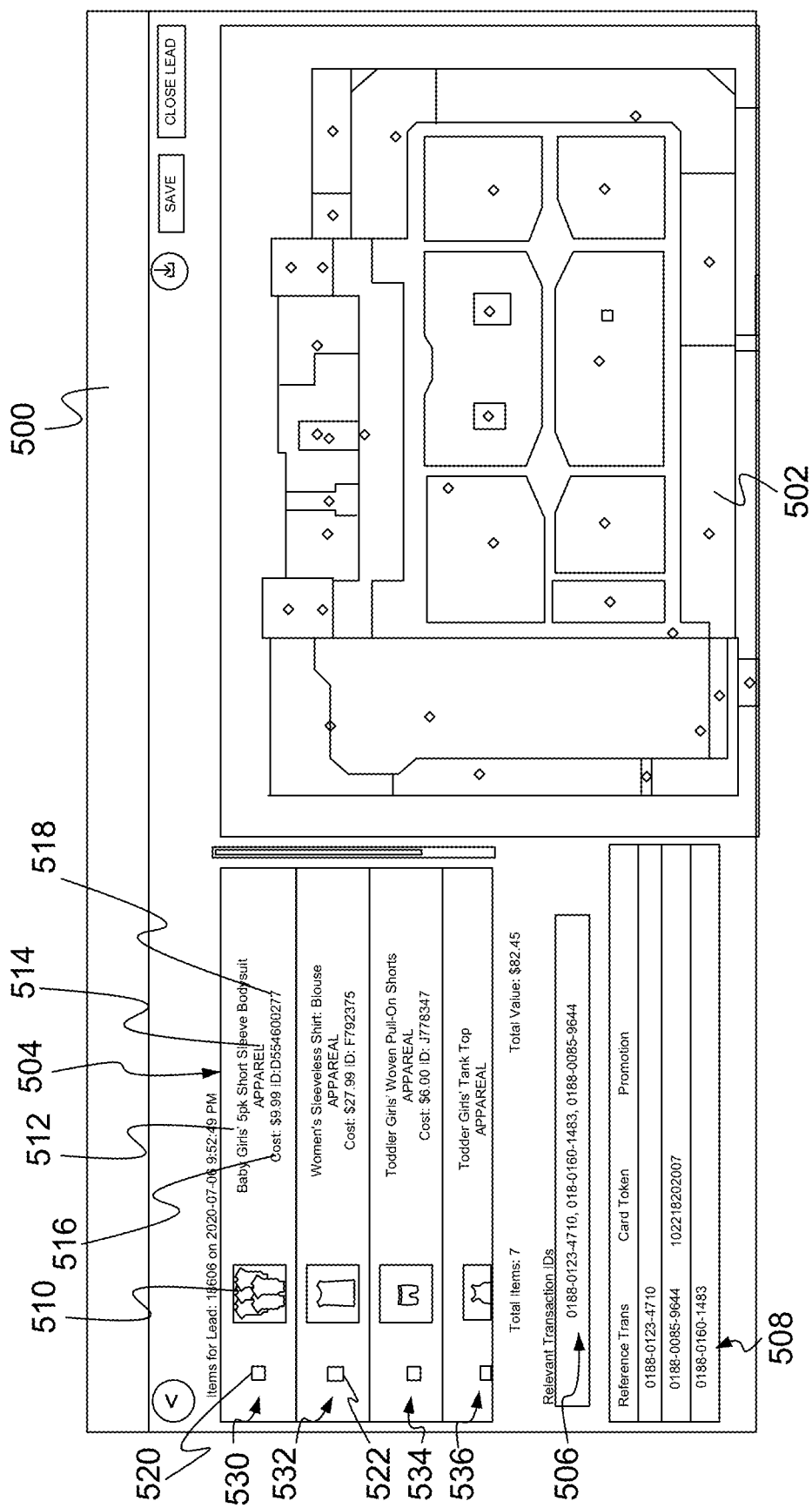
FIG. 5 is an example of a user interface for an investigation file showing a list of suspect items that were automatically added to the investigation file.

At step 413, user interface generator 304 generates a user interface 315 that contains the map of the space, a list of the suspect items that were removed from the space, and a list of possible related transactions. FIG. 5 provides an example of such a user interface 500, having a map 502 of the space, a list 504 of items that left the space without authorization, and two lists 506 and 508 of related transactions. In FIG. 5, item list 504 contains item entries 530, 532, 534 and 536. Each entry in item list 504 contains an image of the item, such as image 510, a name of the item, such as name 512, a department that the item is part of, such as department 514, a cost of the item, such as cost 516, an identifier for the item, such as identifier 518, and a selection control, such as selection controls 520 and 522.

Figure 6:
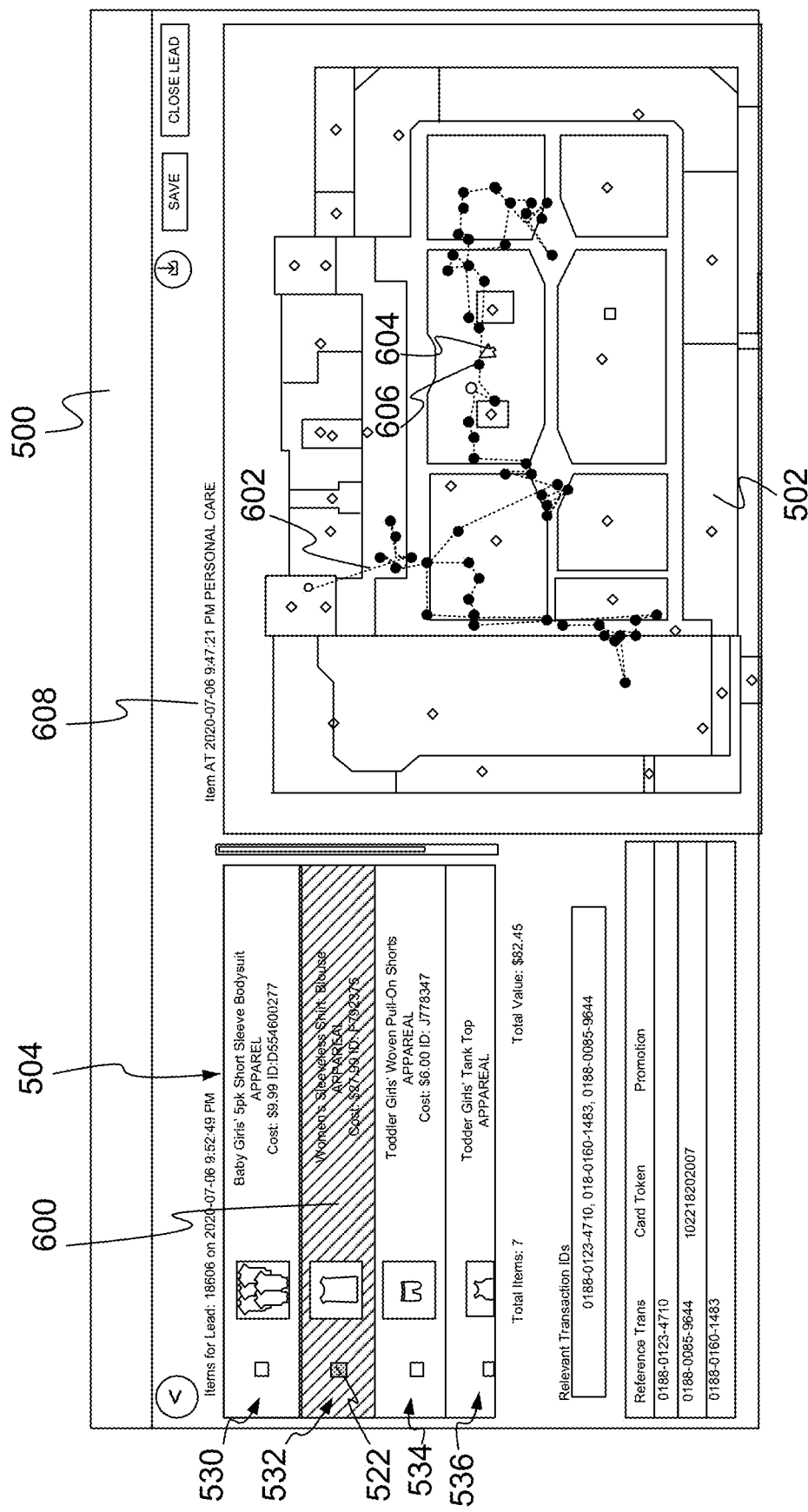
FIG. 6 shows the user interface of FIG. 5 with one of the item entries selected.

At step 414, a selection of one of the selection controls in item list 504 is received. For example, selection control 522 is selected. Based on this selection, a highlight color is added to the selected entry at step 416. An example of the addition of a highlight color is shown in FIG. 6 where user interface 500 has been modified to add highlight color 600 based on the selection of selectin control 522.

At step 418, a path for the item selected in step 414 is retrieved from the common investigation file 124. This is the path that the item followed before exiting the space without authorization and consists of a set of locations with associated time stamps representing when the item was at each location. At step 420, metadata for each location in the path is retrieved. This metadata can include for example a department that the location is within and a list of cameras or stored videos that captured images of the location at the time the item was in the location.

At step 422, the path locations are converted from the coordinates of the space to the coordinates of the map. In accordance with one embodiment, this conversion is performed using the relationship between the X coordinates of the location designations for the space and the X coordinates of the map graphic as well as the relationship between the Y coordinates of the location designations for the space and the Y coordinates of the map graphic.

At step 424, user interface generator 304 draws lines between the map coordinates formed from the path locations. In particular, user interface generator 304 uses the corresponding timing information for each location to draw a separate line between each pair of temporally successive locations.

At step 426, user interface generator 304 sets a pointer hover event 314 for each path location. Each hover event designates the map coordinates of the location, a distance in pixels that indicates how close to the path location the pointer must hover to trigger the event, and text to be displayed when the hover event is generated by the operating system. In accordance with one embodiment, the text includes the date and time that the RFID tag was at the location, the department that the location is found within and identifiers for one or more cameras that captured images of the space.

At step 428, user interface 315 is modified to display the points and lines of the selected item's path on top of the displayed map. An example of such points and lines is shown as path 602 on map 502 of FIG. 6. In accordance with one embodiment, the color of the points and lines displayed on the map is the same as the highlight color 600 used to highlight the entry. This provides an association between the entry and the displayed path to assist the user in understanding that the path is for the highlighted entry.

FIG. 6 also shows that pointer 604 has hovered near a point 606 causing the hover event for that point to trigger. As a result, a text 608 has been displayed above map 502 to indicate the date and time the item was at that location and the department that the location is positioned within. In accordance with one embodiment, text 608 is the same color as highlight color 600 to indicate what item the text is for.

Figure 7:
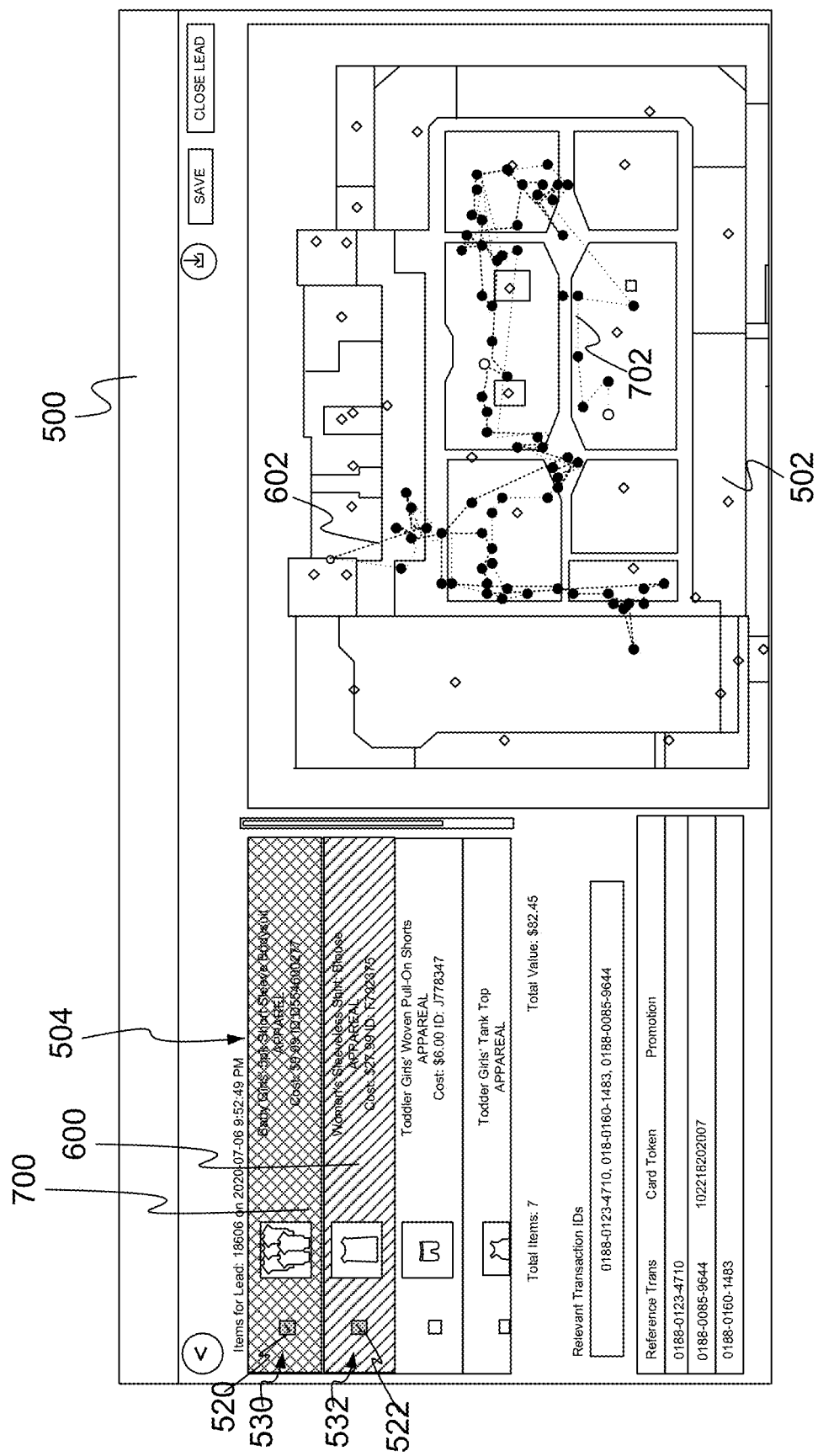
FIG. 7 shows the user interface of FIG. 5 with two item entries selected.

The process of FIG. 4 then returns to await selection or deselection of an item in item list 504. Multiple items may be selected at the same time as shown in FIG. 7 where entries 530 and 532 have been selected. Entry 530 is highlighted with highlight color 700 and entry 532 is highlighted with highlight color 600. A path 702 for the item of entry 530 has been added to map 502 so that paths 602 and 702 are shown at the same time. The color of path 702 is the same as highlight color 700 to indicate that path 702 is for the item in entry 530. Hover events have also been created for the points in path 702 and will cause text for those points to be displayed during a hover event. In accordance with one embodiment, the text for those points will be the same color as highlight color 700.

Items that were previously selected can be deselected at step 432 using selection controls such as controls 520 and 522. In response, the points and lines of the displayed path for the entry are removed at step 434, the highlighting around the entry is removed at step 436, and the hover events are canceled at step 438. The process of FIG. 4 then returns to wait for selection of an entry or deselection of an entry.

Figure 8:
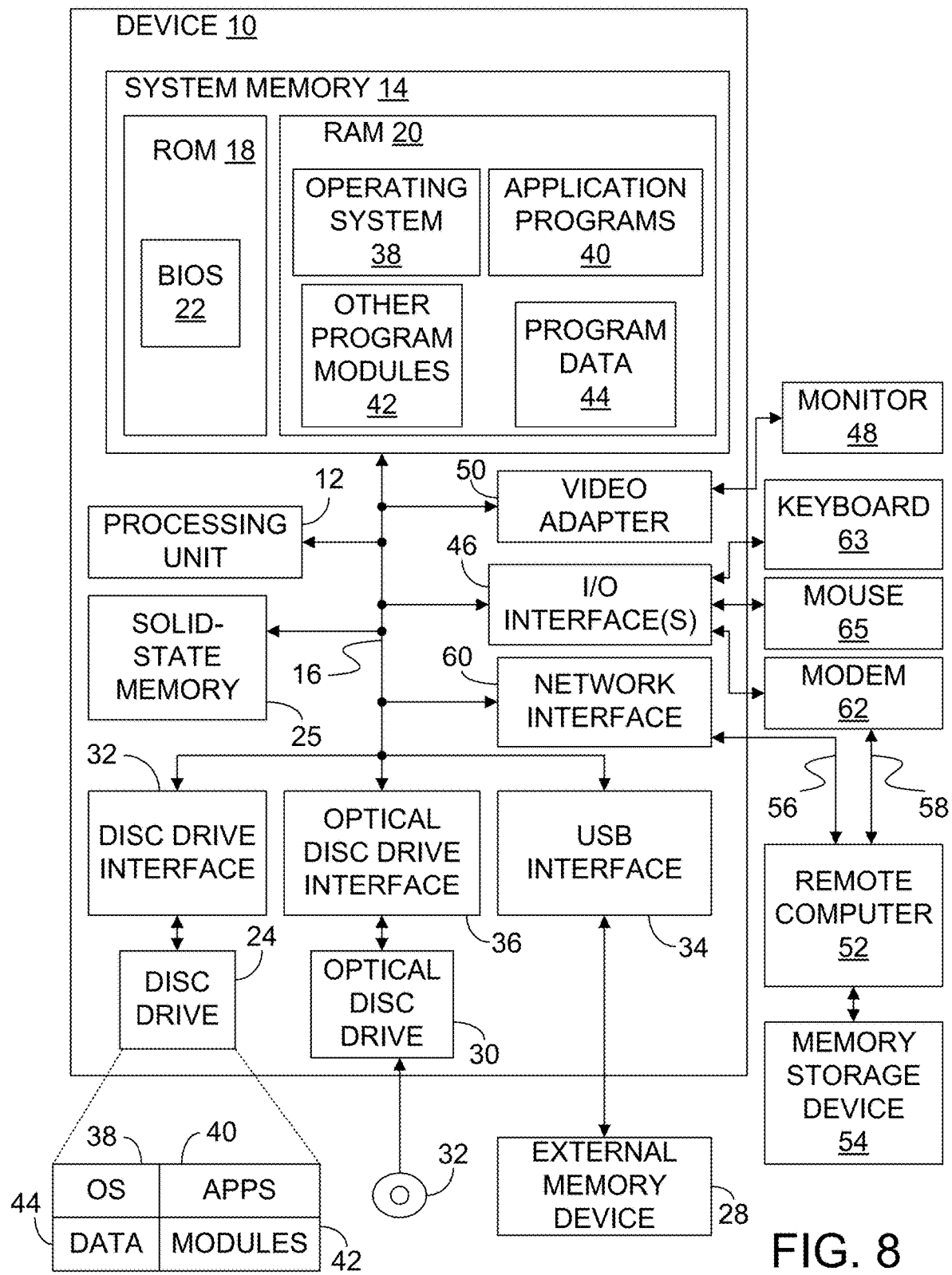
FIG. 8 is a block diagram of a computing device.

FIG. 8 provides an example of a computing device 10 that can be used as computing device 106 or computing device 301. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 8. The network connections depicted in FIG. 8 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 8 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
   determining that a group of items left a space together based on RFID exit times, wherein an RFID exit time for an item is a time when the item passed an RFID receiver positioned at an exit of the space;
   determining that at least one item of the group of items left the space without authorization by evaluating transactions that took place within a time period before the at least one item left the space;
   determining that at least one item in the group of items was authorized to leave the space;
   retrieving an identifier of at least one of a person and a payment method involved in a transaction that authorized the item to leave the space;
   automatically creating a single investigation file that includes RFID records of the group of items that left the space together, wherein the single investigation file is stored as one of a plurality of investigation files;
   adding the identifier to the investigation file;
   searching other investigation files for the identifier; and
   linking together investigation files that include the identifier.

2. The computer-implemented method of claim 1 wherein determining that the group of items left the space together comprises determining that each item in the group of items left the space within a period of time of each other.

3. The computer-implemented system of claim 1 further comprising storing paths of the items through the space in the investigation file.

4. The computer-implemented system of claim 3 further comprising storing camera information for the items in the investigation file.

5. The computer-implemented system of claim 1 further comprising:
   generating a user interface showing a map of the space and a path of an item in the group of items;
   receiving an indication that a pointer is hovered over a portion of the path; and
   displaying a time at which the item was located at the portion of the path.

* * * * *